US012612227B2

(12) United States Patent
Quinn et al.

(10) Patent No.: US 12,612,227 B2
(45) Date of Patent: Apr. 28, 2026

(54) BRAKE FLUID RESERVOIR CAP

(71) Applicant: GM GLOBAL TECHNOLOGY OPERATIONS LLC, Detroit, MI (US)

(72) Inventors: Brian W. Quinn, Macomb Township, MI (US); James A. Webster, Bloomfield Hills, MI (US); Brian S. Paprocki, Macomb, MI (US); Chia N. Yang, Clarkston, MI (US); David A. Skoog, Royal Oak, MI (US); Kenneth S. Kojamanian, Troy, MI (US); Randall Lee Johnson, Ortonville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/680,783

(22) Filed: May 31, 2024

(65) Prior Publication Data

US 2025/0368407 A1 Dec. 4, 2025

(51) Int. Cl.
B65D 51/24 (2006.01)
B60T 11/26 (2006.01)
B60T 17/06 (2006.01)

(52) U.S. Cl.
CPC ............ B65D 51/245 (2013.01); B60T 11/26 (2013.01); B60T 17/06 (2013.01); B65D 2203/02 (2013.01)

(58) Field of Classification Search
CPC ... B65D 51/245; B65D 2203/02; B60T 11/26; B60T 17/06

USPC ...... 220/200; 215/227, 230; 40/299.01, 307, 40/311, 674
See application file for complete search history.

(56) References Cited

U.S. PATENT DOCUMENTS

| | | | | |
|---|---|---|---|---|
| 594,274 | A * | 11/1897 | O'Donnell | B65D 51/20 215/232 |
| 2,145,212 | A * | 1/1939 | Edwards | B60K 15/05 292/171 |
| 5,984,122 | A * | 11/1999 | Barker | G06M 1/248 215/277 |
| 11,873,146 | B1 * | 1/2024 | Gonzalez | B65D 83/0409 |
| 2020/0317411 | A1 * | 10/2020 | Reiley | B65D 51/28 |
| 2023/0356897 | A1 * | 11/2023 | Brozell | B65D 47/0804 |

FOREIGN PATENT DOCUMENTS

KR          101455171 B1          10/2014

OTHER PUBLICATIONS

German Office Action from counterpart DE1020241196564, dated May 16, 2025.

* cited by examiner

*Primary Examiner* — Don M Anderson
*Assistant Examiner* — Eric C Baldrighi

(57) ABSTRACT

A closure assembly including: a cap with an inner surface and an outer surface opposite to the inner surface, the inner surface including an interface configured to cooperate with a finish of a fluid reservoir to close the fluid reservoir, and the outer surface including an icon; and a plate mounted to the cap over the outer surface with a retention member, the plate defining an opening through which the icon is visible. The plate is removable from the cap by detaching or severing the retention member.

17 Claims, 6 Drawing Sheets

BRAKE FLUID RESERVOIR CAP

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a brake fluid reservoir cap configured to cooperate with a finish of a brake fluid reservoir for an automobile.

Vehicles include a brake fluid reservoir in which brake fluid is stored. The reservoir is closed with a cap. Regulatory authorities mandate that various information be included on the cap. The information that must be included varies across different jurisdictions. Thus, different brake caps with different information must be used depending on where the vehicle is to be sold.

SUMMARY

The present disclosure provides for, in various features, a closure assembly including: a cap including an inner surface and an outer surface opposite to the inner surface, the inner surface including an interface configured to cooperate with a finish of a fluid reservoir to close the fluid reservoir, and the outer surface including an icon; and a plate mounted to the cap over the outer surface with a retention member, the plate defining an opening through which the icon is visible. The plate is removable from the cap by detaching or severing the retention member.

In further features, the icon at the outer surface of the cap is a brake fluid icon.

In further features, the closure assembly of claim 1, wherein the outer surface of the cap further includes a check owner's manual icon and DOT 4 text.

In further features, the plate includes warning text at an outer plate surface of the plate.

In further features, the retention member is a first retention member, the closure assembly further including a second retention member that is opposite to the first retention member, the second retention member mounting the plate to the cap.

In further features, the plate further includes a break-away area proximate to the retention member to facilitate decoupling of the plate from the retention member, the break-away area of the plate is relatively thinner than an adjacent area of the plate.

In further features, the cap further includes a knob protruding from the outer surface of the cap, the knob configured to cooperate with an inner plate surface of the plate to restrict rotation of the plate relative to the cap.

In further features, the cap further includes a rod extending from the outer surface of the cap and the plate defines a receptacle at an outer perimeter thereof configured to couple to the rod to restrict rotation of the plate relative to the cap.

In further features, the retention member is a fastener extending through a plate aperture of the plate and seated in a cap aperture of the cap.

In further features, the retention member is a post extending from the outer surface of the cap, the post is integrally molded with the cap.

In further features, the post includes a head and a rod, the plate is rotatable about the rod.

The present disclosure also includes, in various features, a closure assembly including: a cap including an inner surface and an outer surface opposite to the inner surface, the inner surface including an interface configured to cooperate with a finish of a brake fluid reservoir of an automobile to close the brake fluid reservoir, and the outer surface including a brake fluid icon; and a plate mounted to the cap over the outer surface with a retention member in contact with both the plate and the cap, the plate is rotatable about the retention member, the plate including warning text at an outer plate surface of the plate, and the plate defining an opening through which the brake fluid icon is visible. The plate is removable from the cap by detaching or severing the retention member.

In further features, the retention member is integrally molded with the cap.

In further features, the retention member is a first retention member, the closure assembly further including a second retention member that is opposite to the first retention member, the second retention member mounting the plate to the cap.

In further features, the retention member is a first fastener extending through a plate aperture defined by the plate and into a cap aperture defined by the cap.

In further features, a second fastener extends through the plate and into cooperation with the cap.

In further features, a knob protrudes from the outer surface of the cap, the knob configured to cooperate with an inner plate surface of the plate to restrict rotation of the plate relative to the cap.

In further features, the cap further includes a rod extending from the outer surface of the cap and the plate defines a receptacle at an outer perimeter thereof configured to couple to the rod to restrict rotation of the plate relative to the cap.

The present disclosure further includes, in various features, a closure assembly including: a cap including an inner surface and an outer surface opposite to the inner surface, the inner surface including an interface configured to cooperate with a finish of a brake fluid reservoir of an automobile to close the brake fluid reservoir, and the outer surface including a brake fluid icon; a plate mounted to the cap over the outer surface with a retention member in contact with both the plate and the cap, the plate is rotatable about the retention member, the plate including warning text at an outer plate surface of the plate, and the plate defining an opening through which the brake fluid icon is visible; a break-away area of the plate proximate to the retention member to facilitate decoupling of the plate from the retention member, the break-away area of the plate is relatively thinner than an adjacent area of the plate; and an anti-rotation surface protruding from the outer surface of the cap, the anti-rotation surface configured to cooperate with the plate to restrict rotation of the plate relative to the cap. The plate is removable from the cap by detaching or severing the retention member.

In further features, the retention member is integrally molded with the cap.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure is directed to a closure assembly, such as for a fluid reservoir. The closure assembly may be configured to cooperate with a finish of any suitable fluid reservoir, such as a brake fluid reservoir of an automobile. The closure assembly may be configured for non-automotive uses as well.

Regulatory authorities mandate that various information be printed on a cap for a brake fluid reservoir. The information required varies across different jurisdictions. For example, the information required to be printed on a brake fluid cap for a vehicle to be sold in the United States may be different from the information required to be printed on a brake fluid cap for a vehicle to be sold in the United Kingdom or elsewhere outside of the United States. Traditionally, selecting the correct cap to be used on a vehicle complicated assembly. The present disclosure provides for a closure assembly including the information of multiple different jurisdictions, thereby allowing the closure assembly of the present disclosure to be installed on a vehicle regardless of the jurisdiction where the vehicle is intended to be sold. The closure assembly of the present disclosure thus simplifies assembly and reduces assembly time.

Figure 1A:
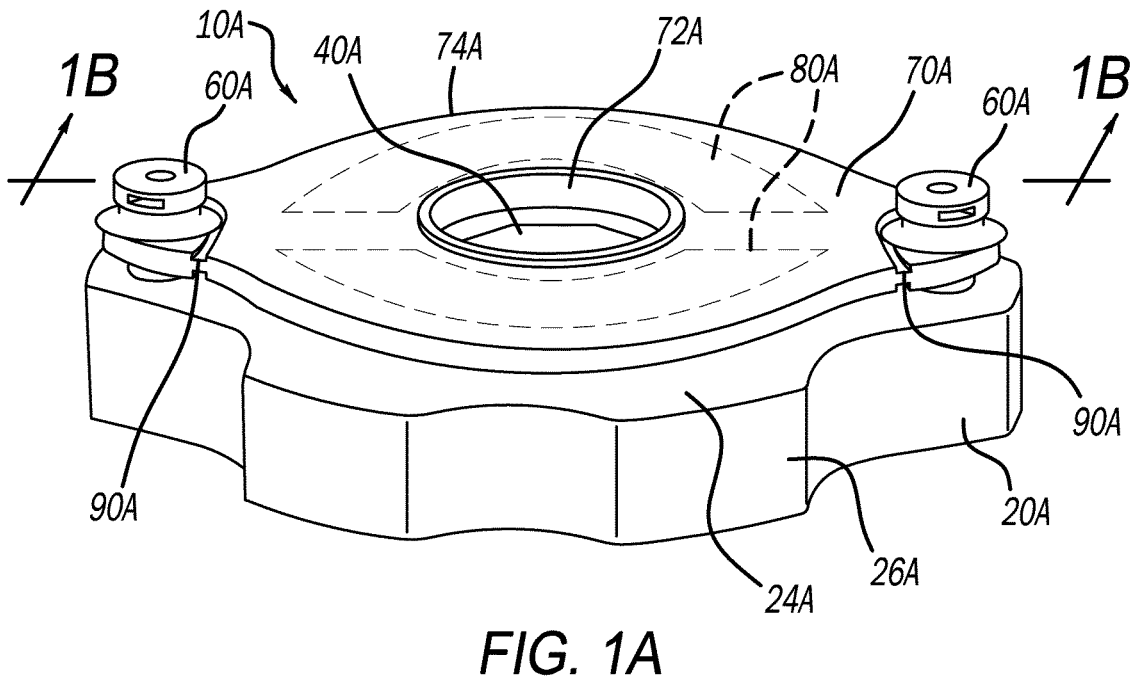
FIG. 1A is a perspective view of a first closure assembly in accordance with the present disclosure, the first closure assembly including a cap and a plate mounted to the cap.
Figure 1B:
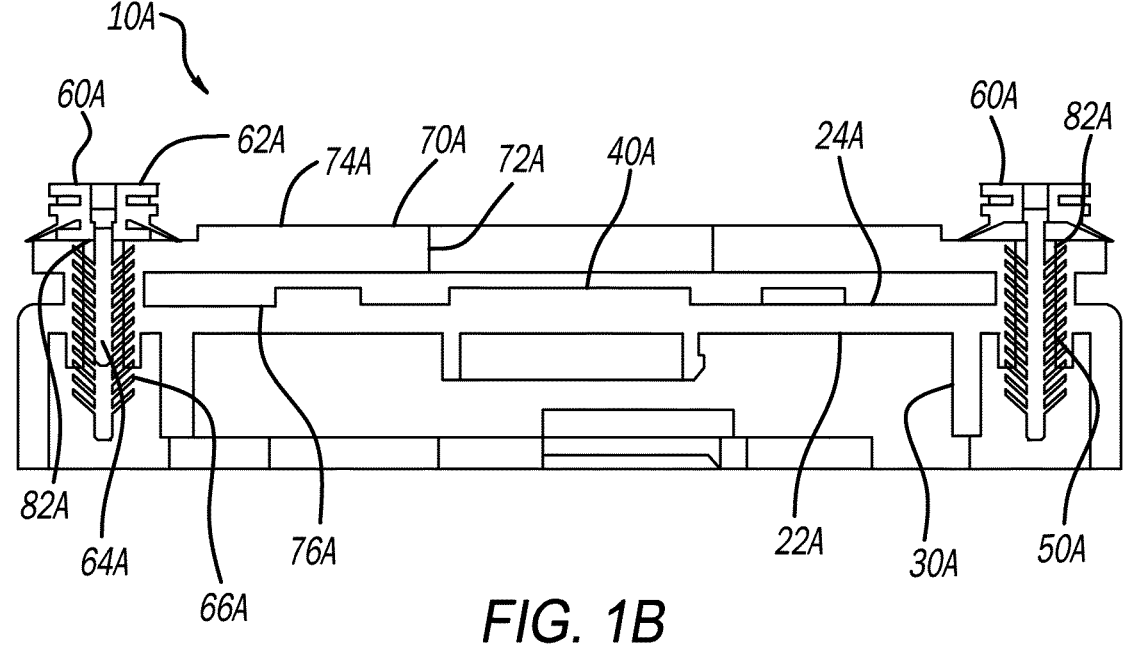
FIG. 1B is a cross-sectional view of FIG. 1A, taken along line 1B-1B of FIG. 1A.
Figures 1C, 2A:
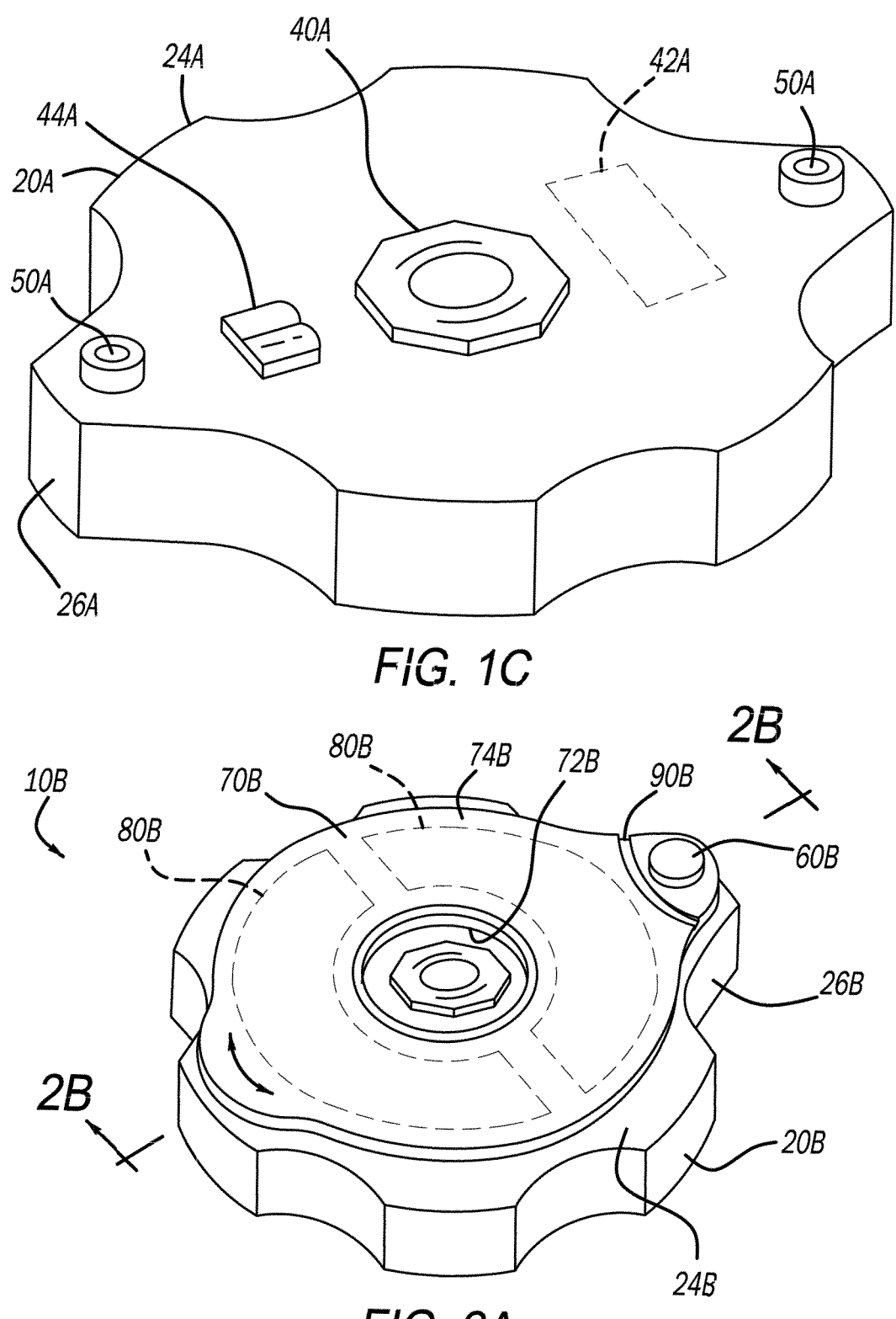
FIG. 1C is a perspective view of the cap of FIG. 1A with the plate removed therefrom.
FIG. 2A is a perspective view of a second closure assembly in accordance with the present disclosure, the second closure assembly including a cap and a plate mounted to the cap.

FIGS. 1A, 1B, and 1C illustrate a first closure assembly 10A in accordance with the present disclosure. The closure assembly 10A is configured to close a fluid reservoir of any suitable fluid, such as brake fluid. The closure assembly 10A is configured for use in both automotive and non-automotive applications.

The first closure assembly 10A generally includes a cap 20A and a plate 70A removably mounted to the cap 20A with any suitable retention members, such as the retention members 60A. As described herein, both the cap 20A and the plate 70A include various information printed thereon in the form of text and/or icons. The plate 70A may include text relevant to a first jurisdiction, such as the United States for example, and the cap 20A may include text relevant to a second jurisdiction, such as the United Kingdom, for example. In situations where the first closure assembly 10A is installed on a vehicle intended to be sold in the second jurisdiction, the plate 70A will be removed from the cap 20A to expose information on the cap 20A.

The cap 20A generally includes an inner surface 22A (FIG. 1B), an outer surface 24A opposite to the inner surface 22A, and a side surface 26A. The inner surface 22A includes an interface 30A, which is configured to cooperate with a finish of a brake fluid reservoir of an automobile to close the brake fluid reservoir. The side surface 26A may include various concave and convex surfaces to facilitate grasping of the cap 20A.

The outer surface 24A of the cap 20A includes information and/or warnings relevant to a particular jurisdiction. For example and with particular reference to FIG. 1C, the outer surface 24A includes a brake fluid icon 40A, such as at a center of the outer surface 24A. The illustrated icon is an internationally accepted icon. Any other suitable icon may alternatively be included. The outer surface 24A further includes a text box 42A, which may include any text relevant to a particular jurisdiction, such as "DOT4," for example. Any other suitable icons may be included, such as a check owner's manual icon 44A, which is generally understood to be an instruction to a user to check the owner's manual for additional information. The icons and text shown in the figures at the outer surface 24A are merely exemplary. The outer surface 24A may be configured with any other suitable icons and text relevant to a particular jurisdiction. The cap 20A further includes cap apertures 50A, which are defined by the cap 20A and extend from the outer surface 24A into the cap 20 and are configured to receive the retention members 60A for fastening the plate 70A to the cap 20A, as further described herein.

The plate 70A defines an opening 72A, and includes an outer surface 74A and an inner surface 76A, which is opposite to the outer surface 74A. When the plate 70A is mounted to the cap 20A, the opening 72A is aligned with the brake fluid icon 40A such that the brake fluid icon is visible through the opening 72A. At the outer surface 74A is printed information and/or warnings that are relevant to a particular jurisdiction where the vehicle may be sold. For example, the outer surface 74A may include two areas 80A of text. One of the areas 80A may have the text printed in a first language, such as English, and another area 80A may have the text printed in a second language, such a French. Exemplary language may include the following in English: "WARNING: CLEAN FILLER CAP BEFORE REMOVING. USE ONLY DOT4 FLUID FROM A SEALED CONTAINER." This language may be printed in French also, for example.

The plate 70A defines plate apertures 82A, which are aligned with the cap apertures 50A. The plate 70A is mounted to the cap 20A such that the inner surface 76A faces the outer surface 24A of the cap 20A. In the example of FIGS. 1A-1C, the plate 70A is mounted to the cap 20A with the retention members 60A. The plate 70A may be mounted to the cap 20A in any other suitable manner, such as described herein with respect to the closure assemblies 10B, 10C, and 10D. The retention members 60A each include a head 62A and a body 64A. Extending from the body 64A are retention tabs 66A. The retention tabs 66A extend from the body 64A at an angle towards the head 62A to facilitate retention of the body 64A within the cap aperture 50A. In the example illustrated, two of the retention members 60A are included, which prevents the plate 70A from rotating relative to the cap 20A. Adjacent to the plate apertures 82A, the plate 70A defines break-away areas 90A, which are areas of the plate 70 that are relatively thinner than surrounding areas of the plate 70A. As explained below, the break-away areas 90A facilitate detachment of the plate 70A. In addition to the break-away areas shown in FIG. 1A, additional break-away areas may be included on sides of the retention members 60A opposite to the break-away areas 90A, and the additional break-away areas may extend generally perpendicular to the break-away areas 90A and extend to the plate apertures 82A.

In jurisdictions where the text included at areas 80A is required, the closure assembly 10A is installed on a vehicle with the plate 70A mounted to the cap 20A. With the plate 70A mounted to the cap 20A, the brake fluid icon 40A is visible through the opening 72A of the plate 70A, but the text box 42A and the icon 44A are covered by the plate 70A. In jurisdictions where the text at text box 42A and the icon 44A are required instead of the text at area 80A, the plate 70A is detached from the cap 20A prior to installation of the closure assembly 10A. The plate 70A may be detached from the cap 20A in any suitable manner. For example, the retention members 60A may be removed. One or both of the retention members 60A may be severed in any suitable manner, such as with any suitable cutting device. If only one of the retention members 60A is severed, the plate 70A may be separated at the break-away area 90A opposite to the severed retention member 60A to completely remove the plate 70A. The plate 70A may also be severed at the break-away areas 90A without severing the retention members 60A.

Figures 2B, 2C:
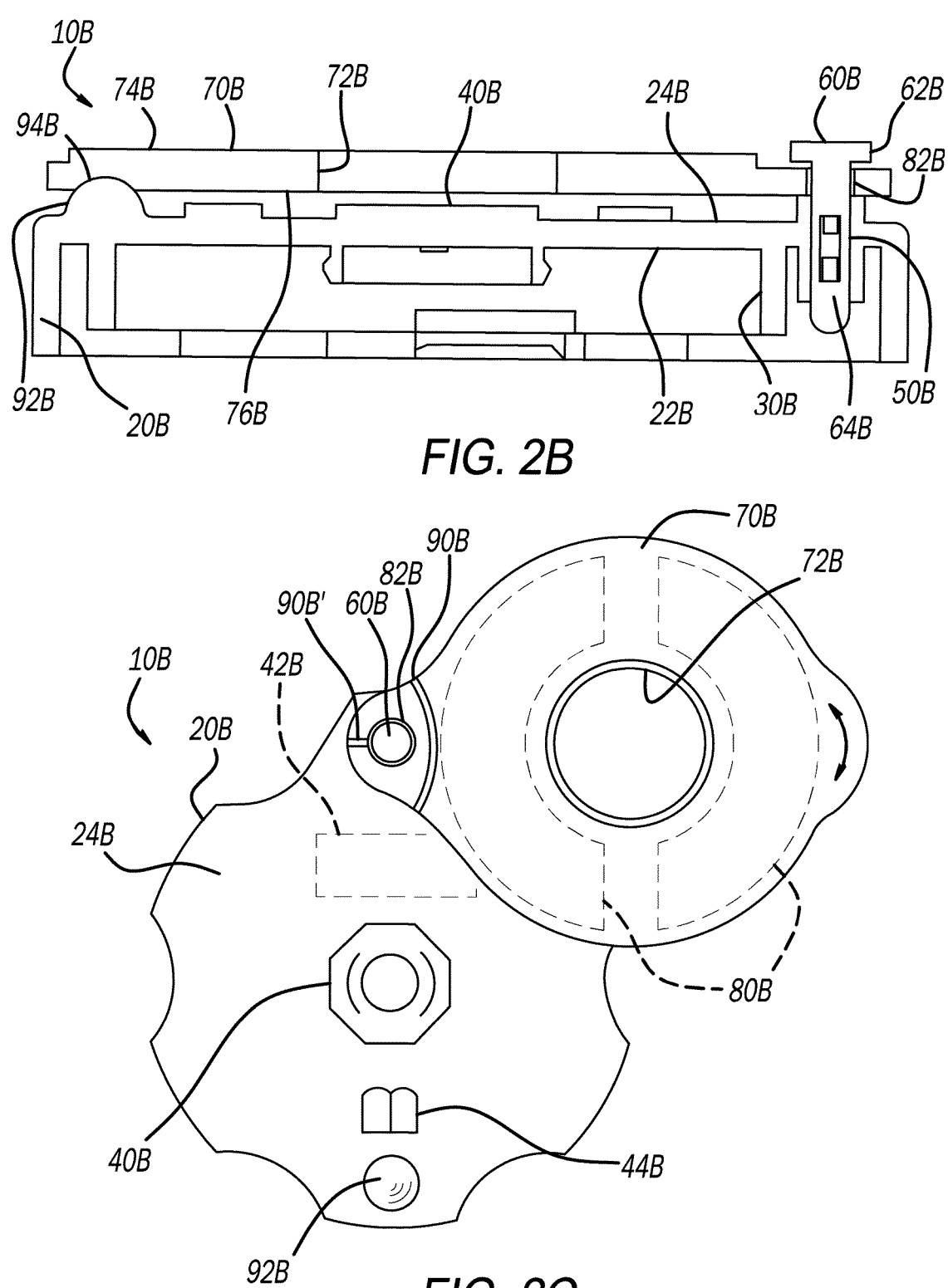
FIG. 2B is a cross-sectional view taken along line 2B-2B of FIG. 2A.
FIG. 2C is a plan view of the second closure assembly with the plate rotated relative to the cap.

FIGS. 2A, 2B, and 2C illustrate an additional closure assembly 10B in accordance with the present disclosure. The closure assembly 10B is similar to the closure assembly 10A, and thus features of the closure assembly 10B that are the same as, or similar to, features of the closure assembly 10A are identified in the drawings with the same reference numbers but with the suffix "B" instead of "A." With respect to the like or similar features, unless otherwise stated, the description of the closure assembly 10A also applies to the closure assembly 10B.

Unlike the closure assembly 10A, the closure assembly 10B includes only a single retention member 60B. The retention member 60B may be the same as the retention member 60A, or be any other suitable retention member/fastener. In the example illustrated, the retention member 60B includes a head 62B and a body 64B. The body 64B includes a tab suitable for retaining the body 64B within the cap aperture 50B. The body 64B may in some applications include the retention tabs 66A. The retention member 60B extends through the plate aperture 82B, and the plate 70B is able to rotate about the body 64B. Rotation of the plate 70B is restricted by a retention knob 92B. The retention knob 92B protrudes from the outer surface 24B of the cap 20B. The retention knob 92B is sized and shaped to cooperate with a receptacle 94B at the inner surface 76B of the plate 70B to restrict rotation of the plate 70B.

In jurisdictions where the text included at areas 80B is required, the closure assembly 10B is installed on a vehicle with the plate 70B mounted to the cap 20A covering the outer surface 24B. With the plate 70B mounted to the cap 20B, the brake fluid icon 40B is visible through the opening 72B of the plate 70B, but the text box 42B and the icon 44B are covered by the plate 70B. In jurisdictions where the text at text box 42B and the icon 44B are required instead of the text at area 80B, the plate 70B is detached from the cap 20B prior to installation of the closure assembly 10B. The plate 70B may be detached from the cap 20B in any suitable manner. For example, the plate 70B may be rotated about the retention member 60B as illustrated in FIG. 2C, and the plate 70B may be broken off at the break-away area 90B by applying force to the plate 70B. An additional break-away area 90B' extending to the plate aperture 82B will facilitate removing the plate 70B in its entirety. The retention member 60B may also be cut using any suitable cutting device, or the retention member 60B may be removed in any other suitable manner.

Figure 3A:
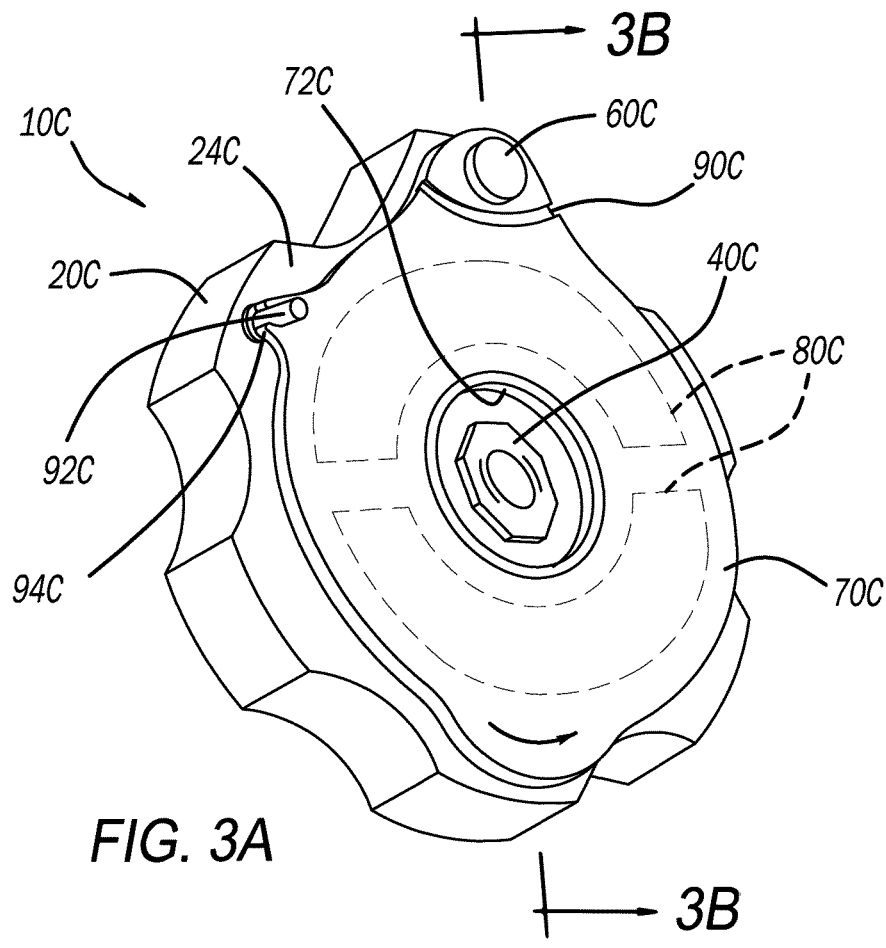
FIG. 3A is a perspective view of a third closure assembly in accordance with the present disclosure, the third closure assembly including a cap and a plate mounted to the cap.
Figure 3B:
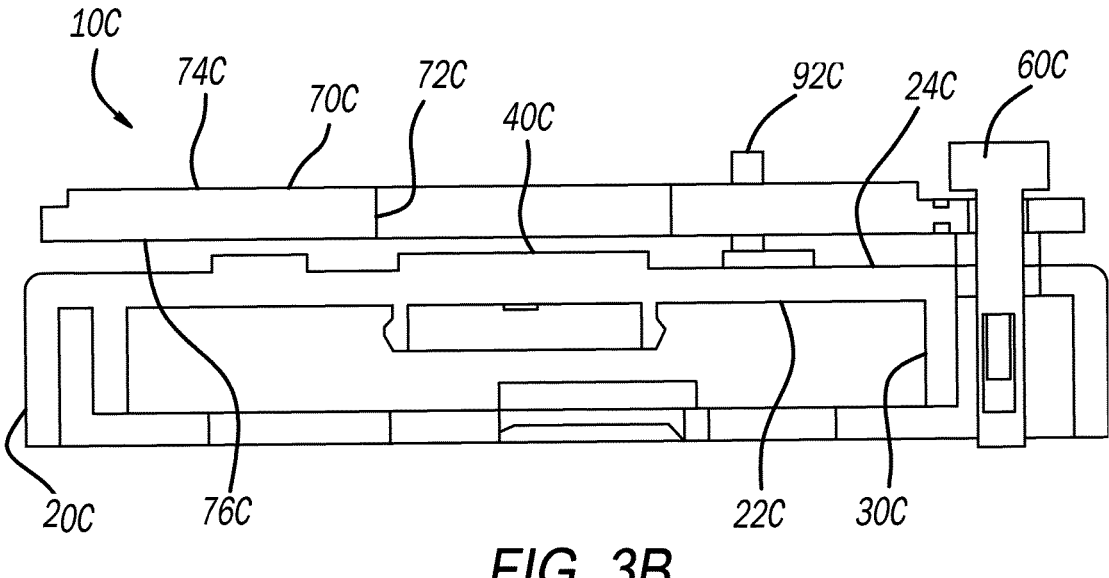
FIG. 3B is a cross-sectional view taken along line 3B-3B of FIG. 3A.
Figure 3C:
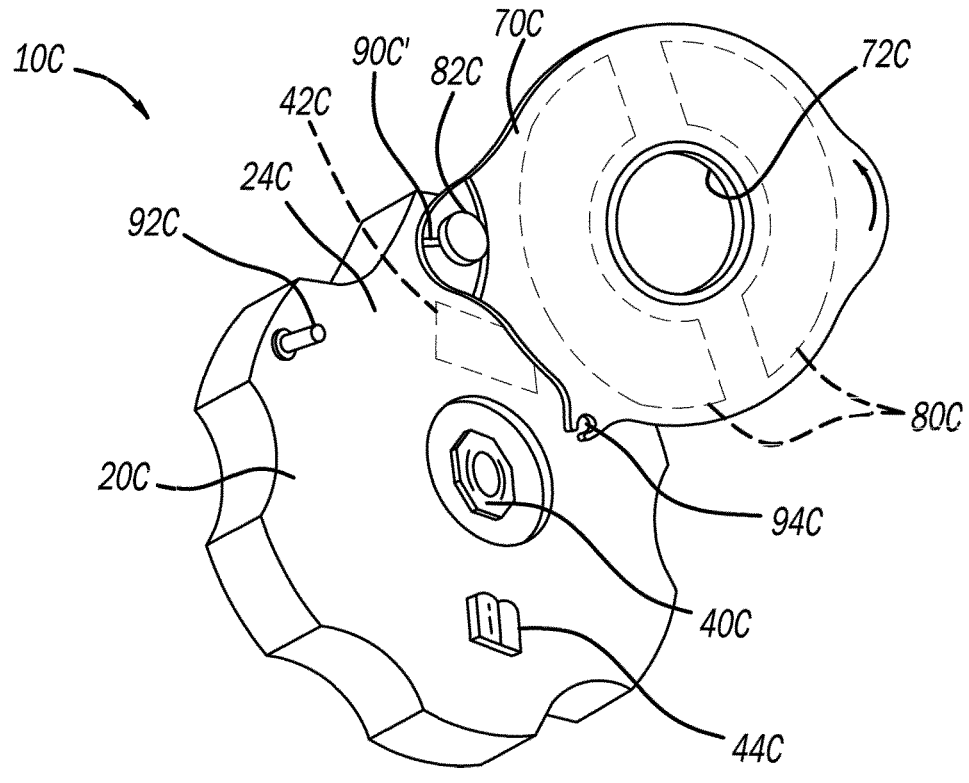
FIG. 3C is a plan view of the third closure assembly with the plate rotated relative to the cap.

FIGS. 3A, 3B, and 3C illustrate an additional closure assembly 10C in accordance with the present disclosure. The closure assembly 10C is similar to the closure assembly 10A and the closure assembly 10B, and thus features of the closure assembly 10C that are the same as, or similar to, features of the closure assembly 10A and the closure assembly 10B are identified in the drawings with the same reference numbers but with the suffix "C" instead of "A" or "B." With respect to the like or similar features, unless otherwise stated, the descriptions of the closure assembly 10A and the closure assembly 10B also apply to the closure assembly 10C.

The cap 20C includes a rod 92C instead of the retention knob 92B. The rod 92C is sized, shaped, and positioned to cooperate with a receptacle 94C defined at an outer perimeter of the plate 70C. Cooperation between the rod 92C and the receptacle 94C restricts rotation of the plate 70C relative to the cap 20C.

In jurisdictions where the text included at areas 80C is required, the closure assembly 10C is installed on a vehicle with the plate 70C mounted to the cap 20C covering the outer surface 24C. With the plate 70C mounted to the cap 20C, the brake fluid icon 40C is visible through the opening 72C of the plate 70C, but the text box 42C and the icon 44C are covered by the plate 70C. In jurisdictions where the text at text box 42C and the icon 44C are required instead of the text at area 80C, the plate 70C is detached from the cap 20C prior to installation of the closure assembly 10C. The plate 70C may be detached from the cap 20C in any suitable manner. For example, the plate 70C may be rotated about the retention member 60C as illustrated in FIG. 3C, which will include detaching the rod 92C from the receptacle 94C, and the plate 70C may be broken off at the break-away area 90C by applying force to the plate 70C. An additional break-away area 90C' extending to the plate aperture through which the retention member 60C extends will facilitate removing the plate 70C in its entirety. The retention member 60C may also be cut using any suitable cutting device, or the retention member 60C may be removed in any other suitable manner.

Figure 4A:
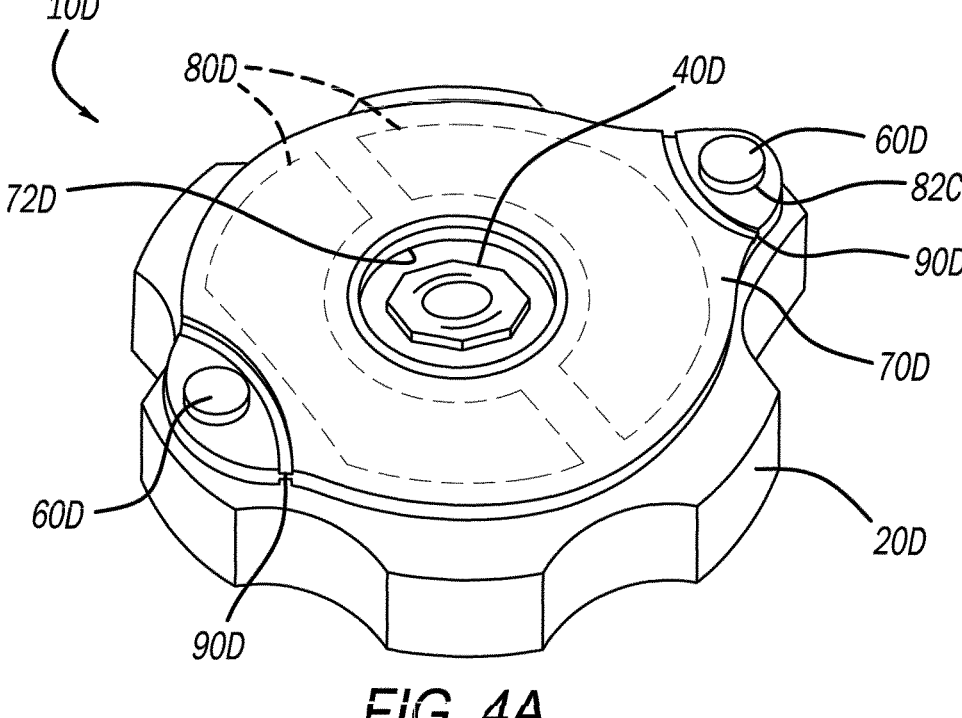
FIG. 4A is a perspective view of a fourth closure assembly in accordance with the present disclosure, the fourth closure assembly including a cap and a plate mounted to the cap.
Figure 4B:
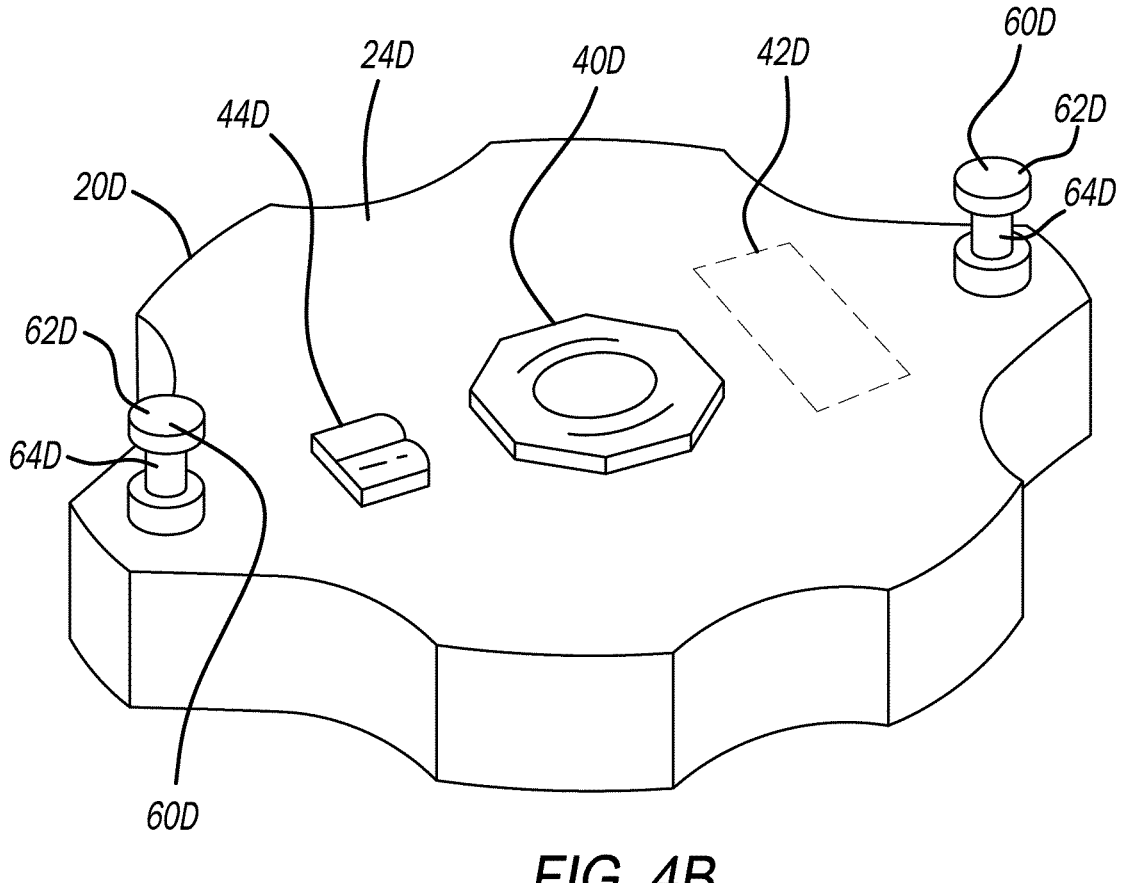
FIG. 4B is a perspective view of the cap of the fourth closure assembly with the plate removed from cooperation with the cap.

FIGS. 4A and 4B illustrate another closure assembly 10D in accordance with the present disclosure. The closure assembly 10D is similar to the closure assembly 10A, the closure assembly 10B, and the closure assembly 10C, and thus features of the closure assembly 10C that are the same as, or similar to, features of the closure assemblies 10A, 10B, and 10C are identified in the drawings with the same reference numbers but with the suffix "D" instead of "A," "B," or "C." With respect to the like or similar features, unless otherwise stated, the descriptions of the closure assemblies 10A, 10B, and 10C also apply to the closure assembly 10D.

With particular reference to FIG. 4B, the retention members 60D are integrally molded with the cap 20D. More specifically, the retention members 60D are initially molded to include the bodies 64D (which in this example are posts), but not the heads 62D. To attach the plate 70D to the retention members 60D, the plate 70D is seated over the bodies 64D (or posts) such that the bodies 64D (or posts) extend through the plate apertures 82C defined by the plate 70D. Then, using any suitable process, the bodies 64D (or posts) are flattened to form the heads 62D over the plate 70D. The heads 62D secure the plate 70D to the cap 20D. The heads 62D may be formed in any suitable manner. For example, the heads 62D may be formed by any suitable welding process, such as sonic welding. To remove the plate 70D, the retention members 60D may be severed in any suitable manner, such as with any suitable cutting tool. The plate 70D may also be detached at break-away areas 90D.

In jurisdictions where the text included at areas 80D is required, the closure assembly 10D is installed on a vehicle with the plate 70D mounted to the cap 20D covering the outer surface 24D. With the plate 70D mounted to the cap 20D, the brake fluid icon 40D is visible through the opening 72D of the plate 70D, but the text box 42D and the icon 44D are covered by the plate 70D. In jurisdictions where the text at text box 42D and the icon 44D are required instead of the text at area 80D, the plate 70D is detached from the cap 20D prior to installation of the closure assembly 10C. The plate 70D may be detached from the cap 20D in any suitable manner, such as by severing the retention members 60D with any suitable cutting device.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A closure assembly comprising:
   a cap including an inner surface and an outer surface opposite to the inner surface, the inner surface including an interface configured to cooperate with a finish of a fluid reservoir to close the fluid reservoir, and the outer surface including an icon at a cap center of the cap;
   a plate mounted to the cap over the outer surface with a retention member that is offset from a plate center of the plate, the plate defining an opening at the plate center through which the icon is visible; and
   an anti-rotation member configured to prevent rotation of the plate relative to the cap, the anti-rotation member is independent of the retention member,
   wherein the plate is removable from the cap by detaching or severing the retention member.

2. The closure assembly of claim 1, wherein the icon at the outer surface of the cap is a brake fluid icon.

3. The closure assembly of claim 1, wherein the outer surface of the cap further includes a check owner's manual icon and DOT 4 text.

4. The closure assembly of claim 1, wherein the plate includes warning text at an outer plate surface of the plate.

5. The closure assembly of claim 1, wherein the plate further includes a break-away area proximate to the retention member to facilitate decoupling of the plate from the retention member, the break-away area of the plate is relatively thinner than an adjacent area of the plate.

6. The closure assembly of claim 1, wherein the anti-rotation member includes a knob protruding from the outer surface of the cap, the knob configured to cooperate with an inner plate surface of the plate to restrict rotation of the plate relative to the cap.

7. The closure assembly of claim 1, wherein the anti-rotation member includes a rod extending from the outer surface of the cap and the plate defines a receptacle at an outer perimeter thereof configured to couple to the rod to restrict rotation of the plate relative to the cap.

8. The closure assembly of claim 1, wherein the retention member is a fastener including a head and a body extending through a plate aperture of the plate and seated in a cap aperture of the cap.

9. The closure assembly of claim 1, wherein the retention member is a post extending from the outer surface of the cap, the post is integrally molded with the cap.

10. The closure assembly of claim 9, wherein the post includes a head and a rod, the plate is rotatable about the rod.

11. A closure assembly comprising:
    a cap including an inner surface and an outer surface opposite to the inner surface, the inner surface including an interface configured to cooperate with a finish of a brake fluid reservoir of an automobile to close the brake fluid reservoir, and the outer surface including a brake fluid icon at a cap center of the cap;
    a plate mounted to the cap over the outer surface with a retention member that is offset from a plate center of the plate and in contact with both the plate and the cap, the plate is rotatable about the retention member, the plate including warning text at an outer plate surface of the plate, and the plate defining an opening at the plate center through which the brake fluid icon is visible; and an anti-rotation member configured to prevent rotation of the plate relative to the cap, the anti-rotation member is independent of the retention member, wherein the plate is removable from the cap by detaching or severing the retention member.

12. The closure assembly of claim 11, wherein the retention member is integrally molded with the cap.

13. The closure assembly of claim 11, wherein the retention member is a fastener including a head and a body extending through a plate aperture defined by the plate and into a cap aperture defined by the cap.

14. The closure assembly of claim 11, wherein the anti-rotation member includes a knob protruding from the outer surface of the cap, the knob configured to cooperate with an inner plate surface of the plate to restrict rotation of the plate relative to the cap.

15. The closure assembly of claim 11, wherein the anti-rotation member includes a rod extending from the outer surface of the cap and the plate defines a receptacle at an outer perimeter thereof configured to couple to the rod to restrict rotation of the plate relative to the cap.

16. A closure assembly comprising:

a cap including an inner surface and an outer surface opposite to the inner surface, the inner surface including an interface configured to cooperate with a finish of a brake fluid reservoir of an automobile to close the brake fluid reservoir, and the outer surface including a brake fluid icon at a cap center of the cap;

a plate mounted to the cap over the outer surface with a retention member that is offset from a plate center of the plate and in contact with both the plate and the cap, the plate is rotatable about the retention member, the plate including warning text at an outer plate surface of the plate, and the plate defining an opening at the plate center through which the brake fluid icon is visible;

a break-away area of the plate proximate to the retention member to facilitate decoupling of the plate from the retention member, the break-away area of the plate is relatively thinner than an adjacent area of the plate; and an anti-rotation surface protruding from the outer surface of the cap, the anti-rotation surface configured to cooperate with the plate to restrict rotation of the plate relative to the cap, the anti-rotation surface is independent of the retention member, wherein the plate is removable from the cap by detaching or severing the retention member.

17. The closure assembly of claim 16, wherein the retention member is integrally molded with the cap.

\* \* \* \* \*